United States Patent [19]

Mestdagh

[11] Patent Number: 4,749,163
[45] Date of Patent: Jun. 7, 1988

[54] MEANS FOR SUPPORTING THE FRAME OF A RECORDING AND/OR REPRODUCING APPARATUS ON A POSITIONING SURFACE, AND SUPPORT FOR SUCH MEANS

[75] Inventor: Gilbert E. Mestdagh, Hasselt, Belgium

[73] Assignee: U.S. Philips Corp., New York, N.Y.

[21] Appl. No.: 36,418

[22] Filed: Apr. 9, 1987

[30] Foreign Application Priority Data

Apr. 9, 1986 [NL] Netherlands ................. 8600892

[51] Int. Cl.⁴ ............................................. F16M 13/00
[52] U.S. Cl. .................................... 248/615; 248/638; 248/188.9
[58] Field of Search ............. 248/615, 632, 634, 638, 248/677, 151, 188.8, 188.9, 359.1; 267/141, 153

[56] References Cited

U.S. PATENT DOCUMENTS

| 70,490 | 11/1867 | Winchester | 248/188.9 |
| 85,071 | 12/1868 | Collins | 248/188.9 |
| 2,103,095 | 12/1937 | Schermerhorn | 248/188.9 |
| 2,572,718 | 10/1951 | Gifford . | |
| 3,103,332 | 9/1963 | Waters | 248/615 |
| 3,199,819 | 8/1965 | Widmark | 248/188.9 |
| 4,396,177 | 8/1983 | Liebl . | |
| 4,461,446 | 7/1984 | Hannibal | 248/634 |

FOREIGN PATENT DOCUMENTS

| 953483 | 11/1956 | Fed. Rep. of Germany | 248/615 |
| 1121675 | 1/1962 | Fed. Rep. of Germany | 248/632 |
| 1162983 | 2/1964 | Fed. Rep. of Germany | 248/188.8 |
| 967615 | 11/1950 | France | 248/615 |
| 260779 | 3/1949 | Switzerland | 248/188.9 |
| 734896 | 10/1955 | United Kingdom | 248/615 |
| 2160696 | 12/1985 | United Kingdom . | |

Primary Examiner—J. Franklin Foss
Assistant Examiner—Robert A. Olson
Attorney, Agent, or Firm—Ernestine Bartlett

[57] ABSTRACT

A means for supporting the frame of a recording/reproducing apparatus on a positioning surface includes a plurality of supports of an elastic material. Each support is constructed as an elastic socket, an outer portion adjoining the bottom of the socket. At the bottom of the socket a base portion is formed as a locally thickened portion. By means of the base portion the socket can be placed on the positioning surface. The frame carries a projection whose free end bears against the center of an end wall of the base portion situated inside the socket.

12 Claims, 2 Drawing Sheets

MEANS FOR SUPPORTING THE FRAME OF A RECORDING AND/OR REPRODUCING APPARATUS ON A POSITIONING SURFACE, AND SUPPORT FOR SUCH MEANS

FIELD OF THE INVENTION

The invention relates to a means for supporting the frame of a recording and/or reproducing apparatus on a positioning surface. A plurality of supports are provided which are each constructed as an elastic socket comprising a substantially cylindrical outer portion which is connected to the frame and which is coaxial with a central locally thickened base portion which constitutes the bottom of the socket by means of which the socket can be placed on the positioning surface. A base-portion end wall is situated inside the socket cooperating with a projection on the frame for supporting the base.

BACKGROUND OF THE INVENTION

When a recording and/or reproducing apparatus is supported on a supporting surface such as a table top, it is generally important to allow for undesired vibrations and shocks which may be produced inside the apparatus, referred to as rumble, and which may be produced outside the apparatus and are transmitted to the apparatus via the positioning surface. A general cause of vibrations produced outside the apparatus is microphonics, which means that amplified signals produced by the apparatus and reproduced by a loudspeaker are returned to the apparatus via its supports. For example, in the case of a record player the above effects may cause the record to vibrate and thus disturb the correct playback.

German Utility Model No. 76.27.414 describes means of the kind defined in the opening paragraph. In said means each support is constructed as a rubber socket, the base portion comprising a central stud which is rigidly connected to the end wall and extends from the end wall towards the frame, where it is clamped in a tubular projection on the frame. Thus, in the known means both the outer portion and the base portion are connected to the frame. This central connection restricts the range of lateral movement of the frame relative to the socket in a direction substantially parallel to the positioning surface, so that this socket is less suitable for effectively coping with vibrations and shocks exerted on the frame in a lateral direction, in particular those caused by microphonics.

It is the object of the invention to provide a cheap and simple method of supporting a frame using means of the type defined in the opening paragraph, said supporting means being capable of effectively coping with the above-mentioned rumble, microphonics and shocks acting on the frame in any direction.

SUMMARY OF THE INVENTION

To this end the invention is characterized in that the projection which extends from the frame into the socket has a free end which bears against the centre of the end wall of the base portion. As the socket in accordance with the invention is, in principle, only connected to the frame with its outer portion, and the projection only bears against the centre of the end wall of the base portion, the outer portion is also elastic enough to provide an effective damping of shocks and microphonics acting in a lateral direction. The projection which bears against the thickened base portion ensures that rumble which is transmitted to the projection via the frame is neutralized effectively. Further the base portion is capable of absorbing shocks and vibrations other than those caused by rumble. As only the outer portion of the socket must be connected to the frame, the socket can be mounted easily onto the frame of the apparatus. It also allows the use of a minimal number of parts.

Another preferred embodiment of the invention is characterized in that near its axial end, which is remote from the bottom, the outer portion is locally thickened to form a collar by means of which the socket is clamped between clamping means on the frame. The use of a collar enables the socket to be clamped onto the frame only near this collar. This allows the socket to be deformed easily relative to the projection and other parts on the frame, which is advantageous for damping vibrations and/or shocks.

Another preferred embodiment of the invention is characterized in that the collar has a substantially conical shape at the side of said axial end of the outer portion. The conical shape of the axial end of the outer portion enables the socket to be mounted simply onto the frame.

Another preferred embodiment of the invention is characterized in that the frame carries radially directed first ribs and the projection is a central end portion of a plurality of first ribs, the free end of the projection having a rounded shape. The central arrangement of the projection relative to said plurality of radially directed first ribs and the rounded shape of the projection enables the socket to be aligned effectively relative to the projection, whilst the ribs may also be used for mounting the sockets. The rounded shape of the projection provides a point-like support, which is advantageous for neutralizing vibrations such as rumble.

In this respect another preferred embodiment of the invention is characterized in that the projection is situated on four first ribs which are arranged as crosswise in an axial direction. The use of ribs arranged as a cross has the advantage that these ribs can easily be injection-moulded from a plastics. In this respect a further preferred embodiment of the invention is characterized in that there are provided four further first ribs which are also arranged as crosswise in an axial direction. By the use of two sets of four first ribs, the socket is centred correctly relative to the base portion, whilst nevertheless the socket can readily be fitted over the ribs.

Yet another preferred embodiment of the invention is characterized in that the radial dimension of the first ribs decreases towards the free end of the projection. Since the first ribs have a smaller radial dimension near the free ends, the socket is clear of the edges of the ribs near its free end. Thus, a movement of the socket relative to the first ribs is possible at some distance below the collar, which is advantageous for damping vibrations and shocks.

A further preferred embodiment of the invention is characterized in that the first ribs are each arranged on a rib base which extends in a radial direction relative to the projection, which is connected to the frame and which carries a second radial rib disposed in line with the first rib, a groove being formed between facing side walls of the first and second rib, which side walls from the clamping means for the socket. As a result of this construction using first and second ribs, the collar of the socket can readily be clamped in position without the use of additional parts. Mounting the socket can be simplified even further if at the end wall which is remote from the rib base each second rib is bevelled at the edge facing the first rib.

When the first and the second ribs and the rib bases are formed integrally with the frame, the use of the ribs has the advantage that the ribs can be injection-moulded directly on the underside of a frame portion, whose upper side is exposed to view. Despite the fact that the ribs are injection-moulded on the underside the upper side of said frame portion then has a smooth surface finish.

The invention also relates to a support suitable for use in such means.

An embodiment of the invention will now be described in more detail, by way of example, with reference to the accompanying drawings. In the drawings:

DESCRIPTION OF THE PREFERRED EMBODIMENT

Figure 1:
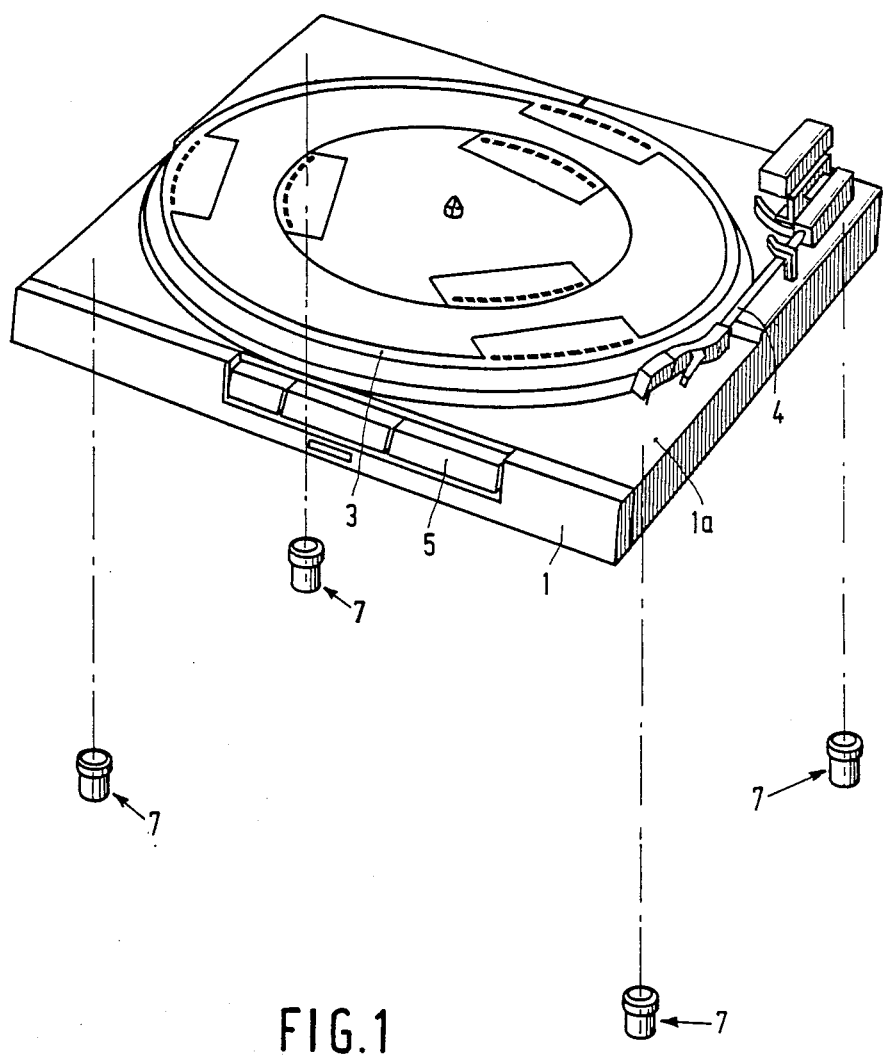
FIG. 1 is a perspective view of an apparatus formed by a record player provided with means in accordance with the invention, comprising four supports.

The recording and/or reproducing apparatus shown in FIG. 1 is, by way of example, a record player comprising a box-shaped plastics frame 1. The frame 1 carries, inter alia, a turntable 3, a pick-up arm 4 and actuating buttons 5.

Figure 2:
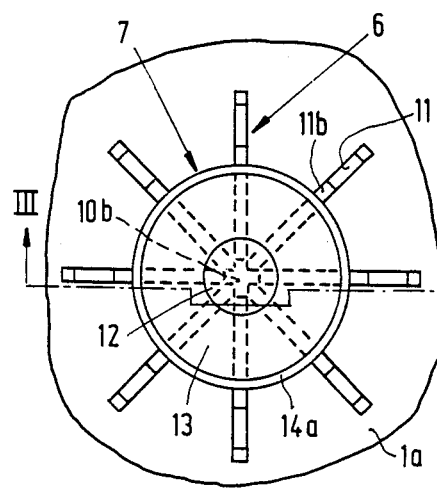
FIG. 2 is an underneath view of a part of the frame of the record player shown in FIG. 1 and a support for said frame.
Figure 3:
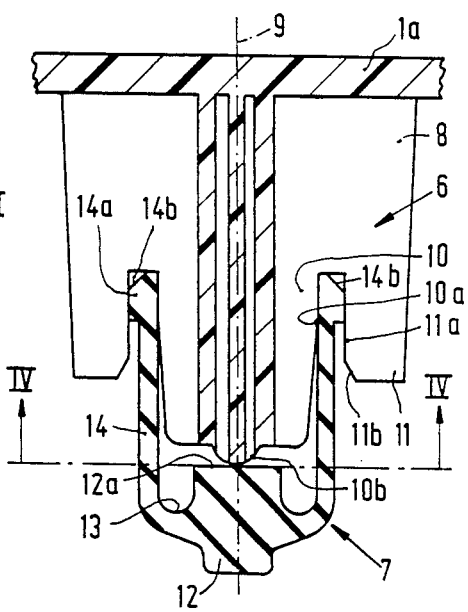
FIG. 3 is a partly sectional view taken on the lines III—III in FIG. 2.
Figure 4:
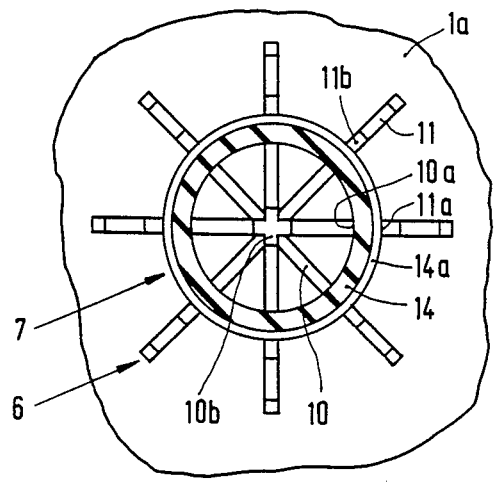
FIG. 4 is a partly sectional view taken on the lines IV—IV in FIG. 3.

On its upper side the frame 1 comprises a deck plate 1a which near the four corners of the frame carries eight ribs 6 on which a support 7 is clamped (see FIGS. 2 to 4). The ribs 6 are injection-moulded directly on the underside of the deck plate 1a and extend downwardly from the deck plate 1a as rib bases 8. The rib bases 8 extend in radial direction relative to an axis 9, which is also the axis of the support 7 which is constructed as a cylindrical socket. The rib bases 8 are arranged in two sets of four rib bases, each set being arranged as a cross. Each rib base 8 carries a first rib 10 and a second rib 11 which extend in line with said base. Between the facing side walls 10a and 11a of the first and the second rib respectively a groove is formed. In a manner to be described hereinafter the side walls constitute clamping means for clamping the support 7. At the end wall which is remote from the rib base the second rib 11 has a bevelled edge 11b. This facilitates mounting of the support 7 into the groove between the side walls 10a and 11a. Further, the radial dimension of the first rib 10 decreased towards the free ends of the ribs. As a result of this, adjoining parts of the support 7 are easily movable relative to the ribs. The free ends of four first ribs 10 carry a projection 10b which is situated centrally and which has a rounded shape. The projection 10b is situated within the support 7 and its free end bears against the centre of an end wall 12a, situated inside the socket, of a base portion 12 of the support 7. The base portion 12 extends both in an inward and in an outward direction relative to the adjoining bottom wall 13 of the support 7. The bottom wall 13 of the support 7 adjoins an outer portion 14 which has a comparatively small thickness and near the axial end which is remote from the bottom is locally thickened to form a collar 14a by which the support 7 is clamped between the side walls 10a and 11a. In order to facilitate mounting of the support 7 onto the ribs 6 collar 14a is given a conical shape at the side of the axial end of the outer portion, as is indicated by the reference numeral 14b.

The support 7 is made of an elastic material, in the present example chloroprene-rubber. This material provides satisfactory damping characteristics for the support, it is cheap, and it does not leave marks when it slides over a surface such as table top.

The apparatus in the form of a record player shown in FIG. 1 is supported effectively by means of the ribs 6 and supports 7 arranged near the four corners of the frame. An important aspect of this construction is that each support comprises only two parts, the ribs 6 being injection-moulded integrally with the frame 1. As a result of this the supports 7 merely need to be slipped over the first ribs 10, after which the supporting means are ready for use. The above construction of each support is not only cheap but also provides very effective damping of vibrations and shocks. In this respect it is important that the support is in fact only clamped-in at the location of the collar 14a, so that owing to inter alia the decreasing radial dimension of the first ribs 10 the outer wall 14 of the support 7 is movable in all directions, i.e including lateral directions, relative to the ribs 10. The point-shaped support by means of the projection 10b is also advantageous because vibrations produced in the apparatus, for example by a drive motor connected to the frame 1, which vibrations are referred as rumble effects, can now be neutralized effectively. The deck plate 1a and the ribs 6 transmit this rumble to the thickened base portion 12 and thus to the positioning surface, where it is neutralized. For this it is important that the projection 10 abuts correctly against the base portion 12. When the frame 1 is thus supported, an effective neutralization of rumble, microphonics and shocks results.

It is to be noted that the means for supporting the frame 1 as described in the forgoing are not only advantageous for supporting an apparatus in the form of a record player in which reproduction is effected by means of a stylus which scans a record. A device in accordance with the invention may also be used advantageously in other equipment, such as optical-disc players, sensitive magnetic-tape equipment etc. whose correct operation may be disturbed by vibrations and shocks.

What is claimed is:

1. Apparatus for supporting a frame of a recording-/reproducing apparatus on a surface comprising:
    a projection adopted to be connected to said frame and to extend downward toward said surface forming a point shaped support;
    a cylindrical elastic socket, open at one end, for receiving said projection, having a substantially cylindrical outer portion, and closed at an opposite end, forming a centrally thickened base portion adapted to reside on the surface, said base portion providing a bearing surface for said projection, neutralizing the effects of vibrations produced by the recording/reproducing apparatus.

2. The apparatus of claim 1 wherein said projection comprises a plurality of intersecting ribs to be formed on said frame, said intersecting ribs extending outward from an axis of intersection to a cylindrical groove having an axis coincidental with the ribs intersection axis, said groove receiving said cylindrical socket open end.

3. The apparatus of claim 1 wherein said socket open end includes a collar which clamps said socket in said groove.

4. Apparatus as claimed in claim 1, wherein said elastic socket is locally thickened near its axial open end to form a collar.

5. Apparatus as claimed in claim 4, wherein the collar has a substantially conical shape at the side of said axial end of the outer portion.

6. Apparatus as claimed in claim 1 wherein radially directed first ribs are adapted to be carried by the frame and the projection is a central end portion of a plurality of first ribs, the free end of the projection having a rounded shape.

7. Apparatus as claimed in claim 6, wherein the projection is situated on an intersection of four first ribs.

8. Apparatus as claimed in claim 7, further comprising four further ribs which are also arranged crosswise in an axial direction.

9. Appartaus as claimed in claim 6, wherein the radial dimension of the first ribs decreases towards the free end of the projection.

10. Apparatus as claimed in claim 6 wherein the first ribs are each arranged on a rib base extending in a radial direction relative to the projection, which is adapted to be connected to the frame, and which carries a second radial rib disposed in line with the first rib, a groove being formed between facing side walls of the first and the second rib, which side walls form a clamping means for the socket (7).

11. Apparatus as claimed in claim 10, wherein the side wall of each second rib is bevelled at the edge facing the first rib.

12. Apparatus as claimed in claim 10, wherein the first and the second ribs and the rib bases are adapted to be formed integrally with the frame.

* * * * *